United States Patent [19]

Engle

[11] Patent Number: 5,640,266

[45] Date of Patent: Jun. 17, 1997

[54] ELECTRONICALLY ADDRESSED DEFORMABLE MIRROR DEVICE

[76] Inventor: Craig D. Engle, 336 Cline Ave., Griffith, Ind. 46319

[21] Appl. No.: 514,394

[22] Filed: Aug. 11, 1995

Related U.S. Application Data

[63] Continuation-in-part of Ser. No. 958,642, Oct. 7, 1992, Pat. No. 5,561,548.

[51] Int. Cl.⁶ ........................................................... G02F 1/01
[52] U.S. Cl. ...................................................... 359/291; 359/292
[58] Field of Search ........................................... 359/291, 292

[56] References Cited

U.S. PATENT DOCUMENTS

| | | | |
|---|---|---|---|
| 2,644,208 | 7/1953 | Auphan | 22/190 |
| 2,670,523 | 3/1954 | Orthuber et al. | 29/25.17 |
| 2,681,380 | 6/1954 | Orthuber | 178/5.4 |
| 2,682,010 | 6/1954 | Orthuber | 315/3 |
| 2,733,501 | 2/1956 | Orthuber et al. | 29/25.17 |
| 3,654,606 | 4/1972 | Marlowe et al. | 340/166 |
| 3,746,911 | 7/1973 | Nathanson et al. | 315/21 R |
| 3,798,620 | 3/1974 | Cosentino | 340/173 LT |
| 3,886,310 | 5/1975 | Guldberg et al. | 178/7.5 D |
| 3,896,338 | 7/1975 | Nathanson et al. | 315/373 |
| 4,441,791 | 4/1984 | Hornbeck | 350/360 |
| 4,592,628 | 6/1986 | Altman et al. | 350/486 |
| 4,596,992 | 6/1986 | Hornbeck | 346/76 PH |
| 4,710,732 | 12/1987 | Hornbeck | 332/7.51 |
| 4,731,610 | 3/1988 | Baron et al. | 340/784 |
| 4,793,699 | 12/1988 | Tokukara | 350/487 |
| 4,956,619 | 9/1990 | Hornbeck | 330/4.3 |
| 5,198,920 | 3/1993 | Gobeli et al. | 359/245 |
| 5,365,081 | 11/1994 | Yamazaki et al. | 257/67 |
| 5,396,364 | 3/1995 | O'Meara et al. | 359/292 |
| 5,488,505 | 1/1996 | Engle | 359/292 |
| 5,493,439 | 2/1996 | Engle | 359/292 |

OTHER PUBLICATIONS

The International Dictionary of Physics and Electronics, p. 814 1956.
Weimer, Chapter 9, Thin Film Transistors Physics Technology and Applications, Edited by Wallmark and Johnson, Prentice-Hall, Sep. 1971.
Craig D. Engle, Enhanced Surface Deformation Light Modulator, Ser. nr. 8/514,394, filing date Aug. 11, 1995.
Larry J. Hornbeck, 128 X 128 Deformable Mirror Device, IEEE Transactions on Electrons Devices, vol. ED-30, No. 5, May 1983.
Robert E. Brooks, Micromechanical Light Modulators on Silicon, Optical Engineering/Jan./Feb. 1985/vol. 24 No. 1.
Bernard J. Lechner, Liquid Crystal Matrix Displays, Proceedings of the IEEE, vol. 59, No. 11, Nov. 1971.
P. G. LeComber, Present and Future Applications of Amorphous Silicon and it's Alloys, Journal of Non-Crystalline Solids, 115 (1989).

*Primary Examiner*—Bruce C. Anderson

[57] ABSTRACT

A plurality of first electrodes affixed to an insulating substrate is arranged in a matrix of p rows and q columns. Each first electrode is overlapped by a respective deformable reflective conductor. Each first electrode is electrically connected to a respective third switch terminal of a respective thin film transistor. Each transistor is affixed to the substrate. A suitable potential control means is provided to control the potential difference between each first electrode and the respective conductor in accordance with a input signal enabling a wavefront incident on the reflective conductors to be modulated in accordance with the information bearing signal.

9 Claims, 2 Drawing Sheets

ELECTRONICALLY ADDRESSED DEFORMABLE MIRROR DEVICE

RELATED APPLICATION

This application is a continuation in part of earlier application U.S. Ser. No. 07/958,642, filed Oct. 7, 1992 now U.S. Pat. No. 5,561,548 of Craig D. Engle for Enhanced Membrane Light Modulator.

BACKGROUND—FIELD OF INVENTION

This invention relates to methods of construction and addressing of electronically addressed electrostatic light modulators.

BACKGROUND—PRIOR ART

As identified in the patent application admitted to Craig D. Engle titled "Enhanced Surface Deformation Light Modulator", electrostatic light modulators have suffered from a variety of problems. In addition to the problems cited therein, several of the matrix addressing configurations employed with deformable mirror modulators are fabricated utilizing "front side" components. Terminology of front side versus backside components, and device configurations employing these approaches, are presented in the article titled "128×128 Deformable Mirror Device" by Larry J. Hornbeck, IEEE Transactions on Electron Devices, Vol. ED-30, No. 5 May 1983. Examples of front side component configurations include U.S. Pat. No. 4,441,791 to Hornbeck, Apr. 10, 1984. Consequences of front side processing include merging fabrication sequences involving semiconductor circuits and membrane media. As evidenced by the comments in the article "Micromechanical Light Modulators on Silicon" by Robert E. Brooks, integration of membrane modulators on semiconductor integrated circuits is not completely compatible. Due to the complexities of fabricating configurations similar to U.S. Pat. No. 4,441,791, exposure to contamination could be increased.

As identified in U.S. Pat. No. 4,956,619, to Hornbeck, Sep. 11, 1990, configurations similar to U.S. Pat. No. 4,441,791 are plagued by contamination problems which adversely effect manufacturability. As to be shown herein, the backside configuration of my invention could increase the flexibility of fabrication sequences which could be utilized to fabricate components affixed to respective faces, without unduly influencing the components affixed to the other face. Such flexibility provides opportunities to effectively deal with, or reduce the impact of, contamination, thereby enhancing the commercial viability of membrane light modulators.

Backside configurations which have been utilized with electrostatic light modulators include U.S. Pat. No. 3,798,620 to Cosentino, Mar. 19, 1974. Although this configuration provides several benefits due to backside components, the method of construction in U.S. Pat. No. 3,798,620 involves discrete addressing components bonded to the backside of the substrate. Bonding discrete addressing components leads to reliability problems in large arrays. In addition, using discrete addressing components hinders spatial resolution. Furthermore, as to be shown herein, crossover networks in the addressing matrix of the modulator can be eliminated. U.S. Pat. No. 3,798,620 simply translates crossovers networks to other components requirements, rather than eliminating this problem. Simply translating crossover requirements adversely effects reliability since this approach introduces additional bonding requirements. This configuration and the references cited herein serve to illustrate an important point; I believe no electrostatic light modulator has utilized thin film matrix addressing configurations.

The terminology "electrostatic shutter mosaic" was utilized in U.S. Pat. No. 2,681,380 to R. K. Orthuber, Jun. 15, 1954, to describe a deformable mirror device which was electron beam addressed. U.S. Pat. No. 2,682,010 to R. K. Orthuber, Jun. 22, 1954 describes a related device. Methods of fabricating and affixing metalized deformable mirrors, referred to as flaps, are provided in U.S. Pat. No. 2,670,523 to R. K. Orthuber et al, Mar. 2, 1954 and U.S. Pat. No. 2,733,501 to R. K. Orthbuer et al, Feb. 7, 1956. Alternative techniques to fabricate deformable mirrors is provided in U.S. Pat. No. 2,644,208 to M. Auphan, Jul. 7, 1953. Complications associated with electron beam addressing of deformable mirror devices include a vacuum environment, packaging requirements, and high voltages.

As identified in the article "Micromechanical Light Modulators on Silicon" by Robert E. Brooks, Optical Engineering, January/February 1985, Vol. 24, No. 1, the conversion of electronic data into optical form should occur, preferably, without the requirement of high voltage.

Several additional electron beam addressed deformable mirror devices exist. Examples include U.S. Pat. No. 4,592,628, to Altman et al, Jun. 3, 1986, U.S. Pat. No. 3,746,911, to Nathanson et al, Jul. 17, 1973, U.S. Pat. No. 3,886,310 to Guldberg et al, May 27, 1975, and U.S. Pat. No. 3,896,338, to Nathanson et al, Jul. 22, 1975. These patent suffer from the same limitations identified with U.S. Pat. No. 2,691,380. Additional complications of electron beam addressed configurations are identified in U.S. Pat. No. 4,710,732 to Hornbeck, December 1987 and U.S. Pat. No. 4,956,619 to Hornbeck, Sep. 11, 1990.

OBJECTS AND ADVANTAGES

Accordingly, several objects and advantages of my invention include,

1) To show how backside matrix addressing configurations enhances commercial viability of electrostatic light modulators.

2) To introduce thin film matrix addressing configurations which are utilizable with electrostatic light modulators.

3) To introduce thin film matrix addressing configurations which eliminate the requirement for electrical crossover networks in the matrix addressing configuration.

4) To show how reliability, fabrication flexibility, and commercial viability of electrostatic light modulators can be enhanced.

Further objects and advantages of my invention will become apparent from a consideration of the drawings and ensuing description of it.

DESCRIPTION OF INVENTION

Figure 1:
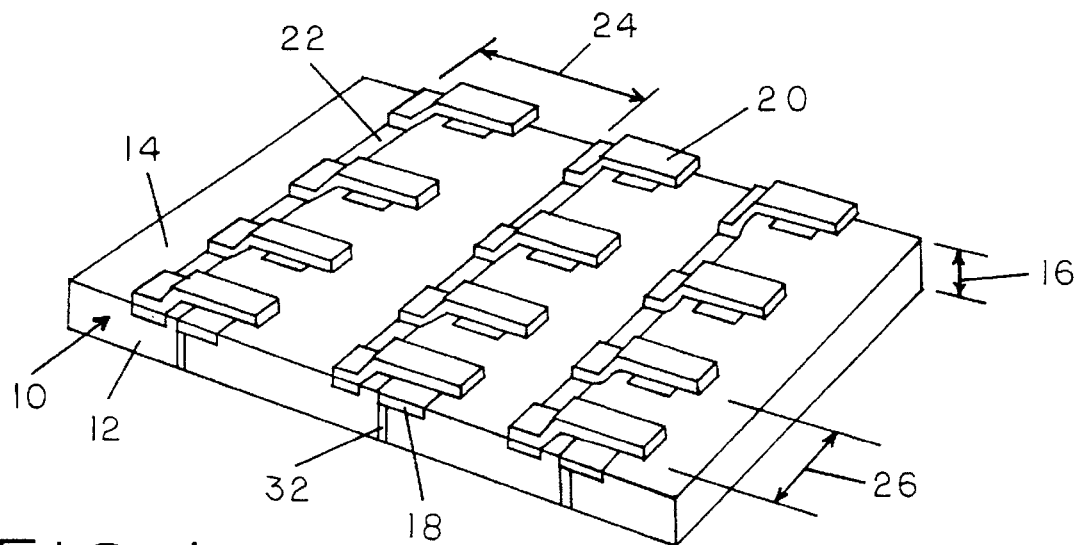
FIG. 1 shows a front side perspective of an electrostatic light modulator.

FIG. 1 shows a shutter mosaic modulator 10. Mosaic 10 contains an insulating substrate 12. Substrate 12 contains a first major face 14 and a second major face. The second major face is not visible in this figure. The second major face is essentially parallel to the first major face. Face 14 and the second major face are separated by a substrate thickness 16. Mosaic 10 further includes a plurality of first electrodes 18 arranged in a matrix of p rows and q columns. Each first electrode 18 is overlapped by a respective deformable reflective conductor 20. As to be described herein, several forms exist for conductor 20. Each conductor 20 is affixed to face 14 by a means. Several means to affix conductors 20 to face 14 have been provided in the references cited herein. Having conductors 20 overlay first electrodes 18 in a one to one correspondence yields a matrix of p rows and q columns of conductors 20.

Every conductor 20 in each column q is electrically connected by a respective column buss 22. Adjacent busses 22 are separated by a first period 24. Period 24 is perpendicular to thickness 16. Adjacent conductors 20 in each column q are displaced by a second period 26. Second period 26 is perpendicular to period 24 and thickness 16. Each electrode 18 is electrically connected to a drain electrode of a respective thin film transistor by a feedthrough means 32. The thin film transistors are not shown in the figure for convenience.

Figure 2:
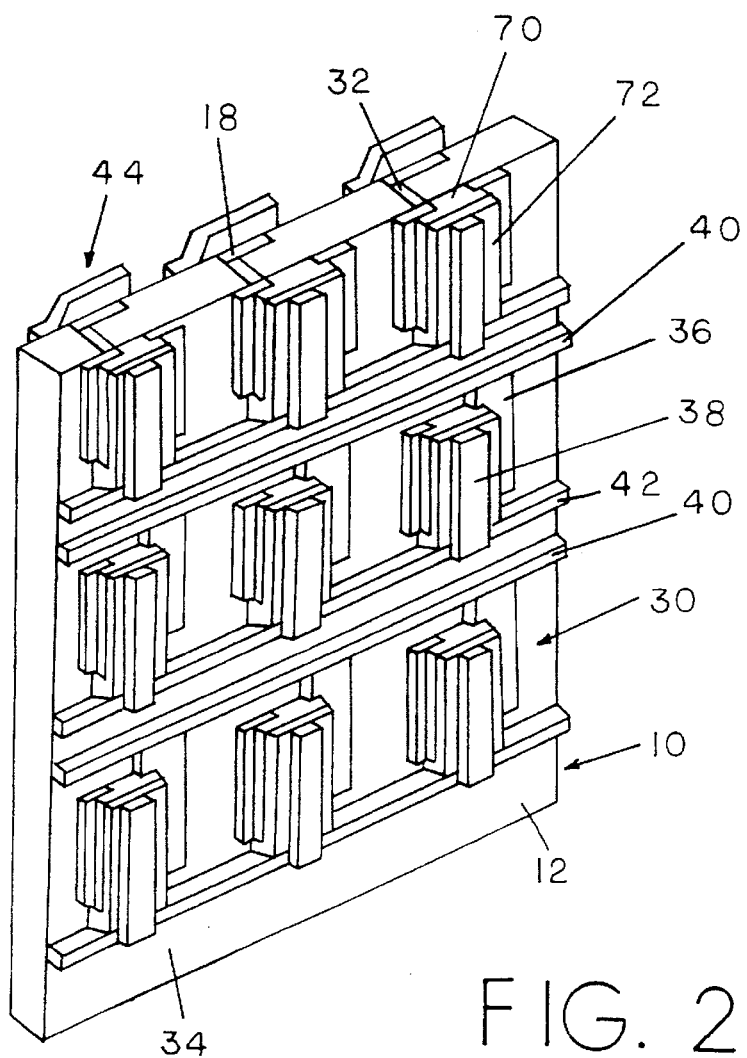
FIG. 2 shows a backside perspective of an electrostatic light modulator.

FIG. 2 shows a second face (backside) perspective of mosaic 10. Several addressing configurations are utilizable with my invention. The following configuration is shown because it posses several desirable features to be described herein. This active switch matrix addressing configuration has been utilized in another patent application submitted by Craig D. Engle titled "Enhanced Surface Deformation Modulator" mailed on Sep. 26, 1992, and is hereby incorporated as reference. Substrate 12 of modulator 10 contains a second major face 34. Each first electrode 18 is electrically connected to a drain electrode 28 of a respective thin film transistor 30 by a feedthrough 32. Each transistor 30 is affixed to face 34 by a means. As well understood by those knowledgeable in the state of the art, thin film transistors could be vacuum deposited on face 34. Vacuum deposition of thin film transistors represents a means to affix and/or form thin film transistors on face 34.

Each first electrode 18 overlaps the respective transistor 30 thereby yielding a matrix of p rows and q columns of transistors 30. Each transistor 30 further includes a source electrode 36 and a gate electrode 38. A plurality of first busses 40 electrically connects every source electrode 36 in each row p to a common potential source. The common potential source is not shown in this figure. Every gate electrode 38 in each row p is electrically connected by a respective second buss 42. A buss associated with the top row is not shown is this figure for convenience. Each second buss 42 is parallel to every first buss 40. Having each first buss parallel to every second buss avoids electrical crossover networks in the active switch matrix. As well understood by those knowledgeable in the state of the art, avoiding electrical crossover networks enhances reliability and simplifies fabrication sequences associated with fabricating modulator 10.

Each first electrode 18 and the respective conductor 20 form an electrostatic deformable pixel element 44. A means is provided to control the potential difference of each pixel element 44 so as to deform each respective conductor 20 in accordance with an information bearing signal, thereby modulating a wavefront incident on mosaic 10. The wavefront is not shown in this figure.

Potential control means are well understood by those knowledgeable in the state of the art. Each second buss is electrically connected to a row decoder module which applies a control signal to a selected second buss, changing the impedance state of every transistor connected by the selected second buss from a high impedance state to a low impedance state, enabling the potential difference of every pixel element in the selected row to be controlled by the potential difference between the common potential source and the potential applied to the respective column buss. The row decoder could provide a random select capability or a consecutive sequence. Methods of establishing potentials on the respective column busses are well understood by those knowledgeable in the state of the art. Circuitry for performing these functions could be contained in modules which could be bonded to the substrate, or fabricated as thin film components to be affixed to the first face and/or the second face of the substrate, in an appropriate fabrication sequence relative to the fabrication of the shutter elements. Interface circuitry is described in the cited references, and is not shown. Pixels could be operated in an analog or in a pulse width modulated manner.

Each transistor 30 further includes a semiconductor material layer 70. Semiconductor materials utilizable with the thin film transistors of my invention includes CdSe. As to be identified herein, alternative switching elements are utilizable with my invention.

Layer 70 of each transistor 30 is in contact with substrate 12. Layer 70 is in electrical contact with the drain electrode 28 and the source electrode 36 of a respective thin film transistor 30. Disposed between layer 70 and gate electrode 38 of each transistor 30 is a respective insulating layer 72. Materials for use as an insulating layer in my invention are well understood by those knowledgeable in the state of the art. Materials for use as drain, source, gate electrodes, conductors, and column busses includes Aluminum. Substrate material options includes glass.

Alternative electronic switching elements are utilizable with my invention. For instance, it is feasible to affix electronic switching elements to the substrate of my invention by transferring a thin layer of semiconductor material which contains the plurality of electronic switching elements to the backside of the substrate in my invention. Transfer techniques and materials which are utilizable with such transfer techniques are well understood by those knowledgeable in the state of the art. For instance, thin layers of silicon semiconductor material containing a plurality of electronic switching elements is utilizable as the electronic switching elements in my invention. Accordingly, any switching element which includes a semiconductor layer in contact with my the substrate of my invention is utilizable in my invention. Due to the flexibility of my invention, several matrix configurations are enhanced by my invention.

Additional addressing configurations which are utilizable in my invention includes the configurations described in the article "Liquid Crystal Matrix Displays" by Bernard J. Lechner et at, Proceedings of the IEEE, Vol. 59, No. 11, November 1971. Additional information concerning some of the configurations discussed in that article include U.S. Pat. No. 3,654,606 to Frank Jerome Marlowe et al, March 1972, and U.S. Pat. No. 4,731,610 to Baron et al, Mar. 15, 1988. As described in U.S. Pat. No. 4,731,610, U.S. Pat. No. 3,654,606 has several drawbacks when utilized with liquid crystal modulators. However, as to be identified herein, configurations similar to U.S. Pat. No. 3,654,606 have several desirable attributes when employed in my invention. In a pulse width mode of operation, several of the "thresholding" and "nonlinearity effects" which plagued U.S. Pat. No. 3,654,606, and are described in U.S. Pat. No. 4,731,610, are inconsequential when configuration of U.S. Pat. No. 3,654,606 is utilized in a pulse width modulated mode. Apparently, by failing to recognize this fact, these modes of operation were not contemplated for use with U.S. Pat. No. 4,731,610 or similar configurations.

Configurations similar to U.S. Pat. No. 3,654,606 are quite complementary with my invention, including U.S. Pat. No. 4,731,610, because they eliminate electrical crossover networks, enhancing reliability.

Figure 3:
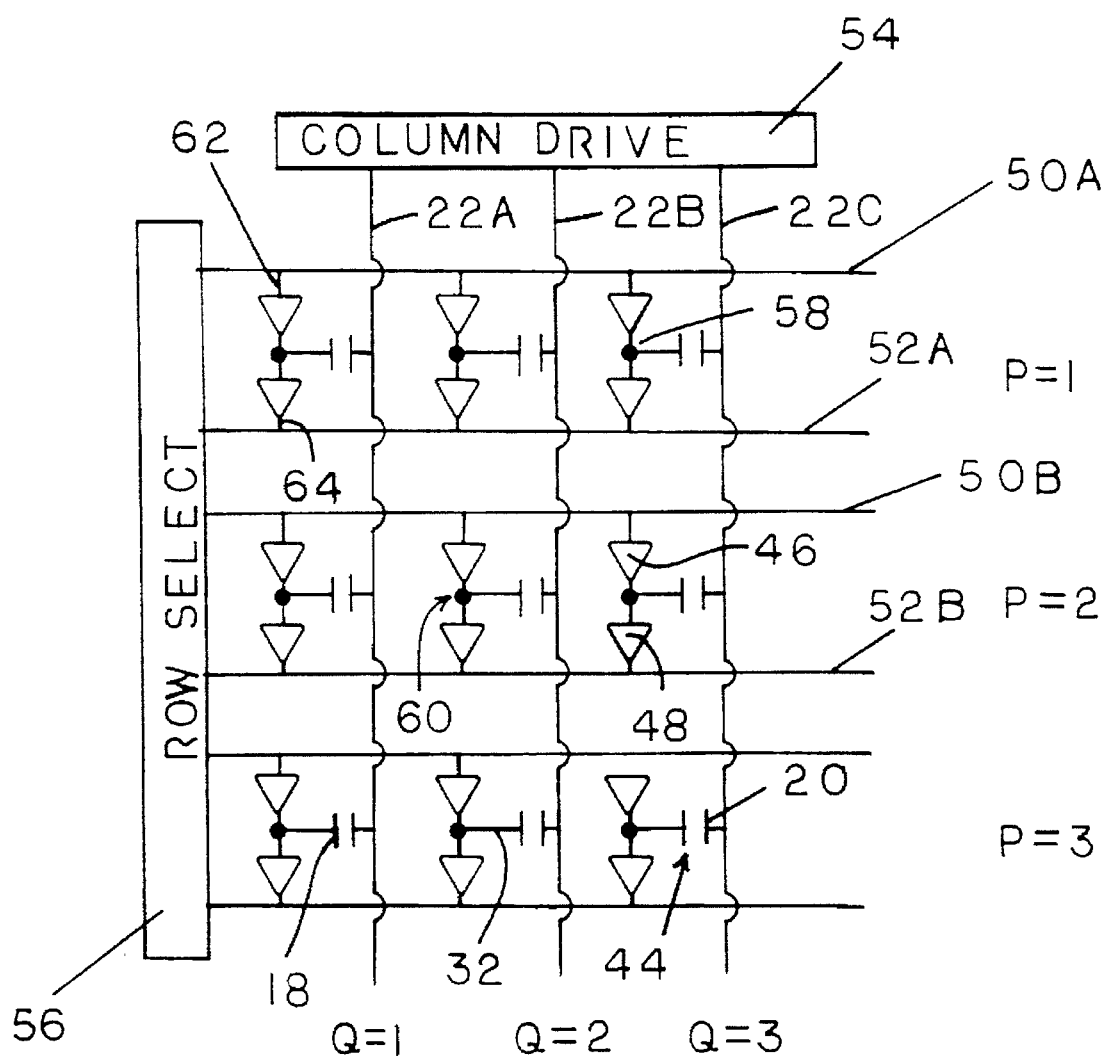
FIG. 3 shows a matrix addressing scheme utilizable with my invention.

FIG. 3 shows a schematic of an active matrix addressing configuration which is utilizable with my invention. A plurality of first electrodes 18 are arranged into a matrix of p rows and q columns. Each pixel element 44 contains a respective electrode 18 and a respective conductor 20. Every conductor 20 in each column q is electrically connected by a respective column buss 22. Every first electrode 18 is electrically connected by a suitable feedthrough means 32 to a respective third terminal 58 of a respective switching element 60. Each switching element 60 is a pair of thresholding devices, a respective first thresholding device 46 and a respective second thresholding device 48.

Every first thresholding device 46 in each row p is electrically connected to a respective first row select buss 50 by a respective first switch terminal 62. Every second thresholding device 48 in each row p is electrically connected to a respective second row select buss 52 by a respective second terminal 64. Every first buss 50 is parallel to each second buss 52. Every first thresholding device 46 and every second thresholding devices 48 can be any threshold device of the type which provides a high impedance to current flow when reversed biased and a comparatively low impedance to current flow when forward biased.

Threshold devices could take the form of diodes, and are coupled in a non-opposing series relation at the respective third terminal 58. A suitable potential control means to control the potential difference between each first electrode and the respective conductor includes a column driver block 54 and a row select address block 56. Operation of the suitable potential control means are well understood by those knowledgeable in the state of the art.

Physical construction of such a matrix configuration is in accordance with my invention. Conductors are affixable by a means to the first face of the substrate. Switching elements are affixable to the second face of the substrate by a means. First electrodes overlap the respective switching elements, and first electrodes are overlapped by the respective conductors. Each first row select buss and each second row select buss is parallel to the first period.

As well understood by those knowledgeable in the state of the art, thin film diodes are capable of being formed from thin film transistors. Accordingly, thin film components utilizable in my invention includes thin film diodes and thin film transistors.

SUMMARY, RAMIFICATIONS, AND SCOPE

Although the description above contains many specifities, these should not be construed as limiting the scope of the invention but merely providing illustrations of some of the presently preferred embodiments of this invention. For instance, several switching elements exists. See for examples U.S. Pat. No. 4,731,610 to Baron et al Mar. 15, 1988. In addition, new transistor structures are being developed to serve a variety of applications. See the information in the article "Present and Future Applications of Amorphous Silicon and it's Alloys" by P. G. Comber, Journal of Non-Crystalline Solids 115 (1989) 1–13. Utilizing the information contained herein, several suitable switching elements may be utilized to realize the advantages of my invention. For instance, additional switching elements utilizable in my invention includes thin film varistors formed on the substrate.

Several suitable means could be utilized to affix switching elements to the second face. Means could include affixing an insulating layer to the second face of the substrate. Such a layer could be phosphosilicate glass or silicon dioxide. Switching elements could be affixed to the exposed face of the insulating layer. The insulating layer could be etched to establish feedthroughs to electrically connect to the feedthroughs in the modulator substrate. Use of an insulating layer affixed to the insulating substrate of the modulator, could allow finer dimensions to be achieved with feedthroughs etched in the insulating layer as compared to the modulator substrate. This could allow the switching elements to overlap respective feedthroughs in the modulator substrate with out shorting the switching elements. This technique could enhance spatial resolution of the modulator.

Use of the insulating layer disposed between the modulator substrate and the switching elements, to assist in affixing switching elements to the substrate, could expand material options available for, and the type of, switching elements utilized in the matrix configuration. These considerations are well understood by those knowledgeable in the state of the art, and are available for consideration in my invention due to the flexibility inherent in my invention. Examples could include laser-induced crystallization of silicon islands affixed to the second face.

As previously identified, several active switch matrix addressing configurations are utilizable with my invention. Although a no crossover matrix configuration provides additional advantages, it does not infer that a matrix configuration with crossovers is precluded from use in my invention. This is important because it is believed that no thin film matrix addressing configuration affixed to the modulator substrate has been proposed for use with electrostatic light modulators.

Accordingly, the potential control means to control the potential difference between each first electrode and the respective conductor is expanded in definition to include a means to electrically the source and/or drain and gates electrodes of each thin film transistor in a manner consistent with the desired matrix configuration. A matrix configuration containing crossovers is described as a "field effect transistor capacitor" addressed configuration of FIG. 13 in the article "Liquid Crystal Displays". Potential control means include a plurality of first terminal column electrodes to electrically connect every source electrode in each column to a respective column electrode voltage source (identified as C1, C2, etc. in FIG. 13). The potential control means further includes a means to hold each column buss at a respective fixed potential (identified as ground potential in FIG. 13). Potential control means further includes electrically connecting every gate electrode in each row by a respective row buss. A row of transistors is selected as previously described (as row pulse generators in FIG. 13), and the drain electrode of each transistor in the selected row is charged to a potential related to the value of the respective column electrode voltage source. This procedure is repeated for each row of pixel elements in the modulator.

When affixing first electrodes to the substrate, first electrodes could be recessed from the first surface and embedded in the substrate. Such techniques represents a means to affix first electrode to the substrate. Affixing first electrodes by recessing first electrodes from the first face provides several benefits. The functionality of the substrate could be increased by allowing the substrate to function as an insulating landing area for certain deformable conductor geometries. Increasing the functionality of the substrates reduces fabrication complexities, and thereby enhances yield. Recessing first electrodes from the first face further avoids electrical shorts involving certain conductor configurations when landing on the insulating substrate. Utilization of backside electronics avoids the requirement of extraneous light blocking components, since the substrate could perform this function, further increasing it's functionality.

As can be seen, several benefits are available with my invention. Accordingly, the scope of my invention should be determined not by the embodiments illustrated, but by the appended claims and their legal equivalents.

I claim:

1. An electrostatic spatial light modulator comprising:

an insulating substrate, first electrode means affixed to said substrate, reflective conductor means affixed to said substrate overlapping and separated from said first electrode means to form a capacitive pixel element, an electronic switch comprising a semiconductor layer in contact with said substrate, said electronic switch comprises a first terminal, a second terminal and a third terminal, said first terminal of said electronic switch is electrically connected to said pixel element, potential control means for applying to said pixel element a potential difference comprising:

means operatively associated with said control means electrically connected to said second terminal of said electronic switch to enable said potential difference to be dependent on a potential applied to said third terminal of said electronic switch, whereby varying said potential difference varies separation between said reflective conductor means and said first electrode means of said pixel element thereby modulating a wavefront incident on said reflective conductor means.

2. The device of claim 1 wherein said electronic switch comprises a transistor.

3. The device of claim 2 wherein said transistor is contiguous with said pixel element.

4. An electrostatic spatial light modulator comprising:

an insulating substrate, first electrode means affixed to said substrate, reflective conductor means affixed to said substrate overlapping and separated from said first electrode means to form a plurality of capacitive pixel elements, a plurality of electronic switches, each said electronic switch comprises a semiconductor layer in contact with said substrate, each said electronic switch comprises a first terminal, a second terminal and a third terminal, said first terminal of each said electronic switch is electrically connected to a respective pixel element, potential control means including said electronic switches for applying to each said pixel element a respective potential difference which is dependent upon a first potential applied to said third terminal of said electronic switch electrically connected to said pixel element, means operatively associated with said potential control means varying said potential differences which varies separation between said reflective conductor means and said first electrode means of the pixel element thereby modulating a wavefront incident on said reflective conductor means of said pixel element.

5. The device of claim 4 wherein each said electronic switch comprises a transistor.

6. The device of claim 5 wherein said transistor of each said switch is contiguous to said pixel element electrically connected to said switch.

7. An electrostatic spatial light modulator comprising:

an insulating substrate, a plurality of pixel elements, each said pixel element comprising:
first electrode means affixed to said substrate,
conductor means affixed to said substrate overlapping and reflective separated from said first electrode means, electrically connected to each said pixel element is a first terminal of a respective electronic switch, each said switch comprises a semiconductor layer in contact with said substrate, each said switch comprises a second terminal and a third terminal, potential control means to apply to each said pixel element a respective potential difference comprising:
means operatively associated with said control means electrically connected to said second terminal of each said electronic switch to enable said potential difference applied to each said pixel element to be dependent on a potential applied to said third terminal of said electronic switch electrically connected to said pixel element, whereby varying said potential difference applied to each said pixel element varies separation between said conductor means and said first electrode means of said pixel element, thereby modulating a wavefront incident on said reflective conductor means of said pixel elements.

8. The device of claim 7 wherein each said electronic switch comprises a transistor.

9. The device of claim 8 wherein said electronic switch electrically connected to each said pixel is contiguous with said pixel.

* * * * *